US008755980B2

(12) United States Patent
Sawada

(10) Patent No.: US 8,755,980 B2
(45) Date of Patent: *Jun. 17, 2014

(54) VEHICLE AND CONTROL DEVICE AND CONTROL METHOD THEREOF

(75) Inventor: Yuichiro Sawada, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1157 days.

This patent is subject to a terminal disclaimer.

(21) Appl. No.: 12/022,595

(22) Filed: Jan. 30, 2008

(65) Prior Publication Data

US 2008/0183359 A1  Jul. 31, 2008

(30) Foreign Application Priority Data

Jan. 31, 2007 (JP) .................. 2007-021239
Nov. 22, 2007 (JP) .................. 2007-302500

(51) Int. Cl.
| | | |
|---|---|---|
| G06F 7/00 | (2006.01) | |
| B60K 17/00 | (2006.01) | |
| B60K 17/04 | (2006.01) | |
| B60W 10/02 | (2006.01) | |
| H02P 15/02 | (2006.01) | |
| H02P 17/00 | (2006.01) | |
| B60W 10/00 | (2006.01) | |
| F16H 61/662 | (2006.01) | |
| F16H 61/664 | (2006.01) | |

(52) U.S. Cl.
USPC .................. 701/54; 701/51; 701/62; 701/67; 180/336; 180/338; 180/347; 180/371; 180/373; 477/5; 477/6; 477/13; 477/15; 477/39; 477/46

(58) Field of Classification Search
USPC ............ 701/51, 54; 180/336–385; 477/1–181
See application file for complete search history.

(56) References Cited

U.S. PATENT DOCUMENTS

| | | | | |
|---|---|---|---|---|
| 4,836,322 A | * | 6/1989 | Sakakiyama | ............... 180/247 |
| 4,879,982 A | * | 11/1989 | Itakura et al. | ................ 477/111 |
| 5,097,724 A | * | 3/1992 | Braun | .............................. 477/73 |
| 5,253,623 A | * | 10/1993 | Melnyk et al. | ........... 123/339.11 |
| 5,681,242 A | * | 10/1997 | Bates | ............................ 477/180 |
| 5,936,152 A | * | 8/1999 | Nishioka et al. | ........... 73/114.25 |
| 5,964,680 A | * | 10/1999 | Salecker et al. | ................ 477/74 |
| 5,980,420 A | * | 11/1999 | Sakamoto et al. | ................ 476/10 |
| 6,063,002 A | * | 5/2000 | Nobumoto et al. | ............. 477/41 |
| 6,190,284 B1 | * | 2/2001 | Kuroda et al. | ................ 477/107 |
| 6,231,478 B1 | | 5/2001 | Sakai | |
| 6,436,001 B1 | * | 8/2002 | Sakai et al. | ................... 475/216 |
| 6,446,499 B1 | * | 9/2002 | Inoue | ......................... 73/114.37 |

(Continued)

FOREIGN PATENT DOCUMENTS

| | | |
|---|---|---|
| DE | 102 43 565 A1 | 4/2004 |
| EP | 1 450 039 A1 | 8/2004 |
| JP | 2004-019740 | 1/2004 |
| WO | WO 96/23136 | 8/1996 |

*Primary Examiner* — James Trammell
*Assistant Examiner* — Majdi Alsomiri
(74) *Attorney, Agent, or Firm* — Rabin & Berdo, P.C.

(57) ABSTRACT

A vehicle with a transmission having a crankshaft and an output shaft. A clutch located between the output shaft and a drive wheel is engaged and disengaged according to a rotational speed of the output shaft. An idle speed control device performs idle speed control to adjust an idle rotational speed of an engine. An electronic control unit (ECU) suppresses or stops the idle speed control when the clutch is engaged, or when an abnormality in the transmission is detected.

20 Claims, 9 Drawing Sheets

(56) References Cited

U.S. PATENT DOCUMENTS

| | | | |
|---|---|---|---|
| 6,513,489 B2* | 2/2003 | Osanai | 123/339.11 |
| 6,729,988 B2* | 5/2004 | Katou et al. | 475/128 |
| 6,966,868 B2* | 11/2005 | Stork et al. | 477/74 |
| 7,247,123 B2* | 7/2007 | Ohtake et al. | 477/98 |
| 7,300,384 B2* | 11/2007 | Eriksson et al. | 477/180 |
| 7,313,977 B2* | 1/2008 | Borghi | 74/13 |
| 2005/0020406 A1 | 1/2005 | Aldrich, III et al. | |
| 2006/0089776 A1* | 4/2006 | Segawa et al. | 701/67 |
| 2006/0166789 A1* | 7/2006 | Katou et al. | 477/167 |
| 2008/0178838 A1* | 7/2008 | Ota | 123/339.1 |

* cited by examiner

VEHICLE AND CONTROL DEVICE AND CONTROL METHOD THEREOF

RELATED APPLICATIONS

This application claims the benefit of priority under 35 USC 119 of Japanese patent application no. 2007-021239, filed on Jan. 31, 2007, and Japanese patent application no. 2007-302500, filed on Nov. 22, 2007, which applications are hereby incorporated by reference in their entireties.

BACKGROUND OF THE INVENTION

1. Field of the Invention

The present invention relates to a vehicle having an electronic continuously variable transmission (CVT) and an idle speed control device, and a control device and method thereof.

2 Description of Related Art

A CVT that performs idle speed control (ISC) is known (for example, JP-A-2004-19740). ISC typically uses an ISC valve to change a passage area of a by-pass passage to increase or decrease the amount of intake air to an engine, thus adjusting the rotational speed of the engine when idling (idle rotational speed).

An electronic CVT (ECVT) is also known. In an ECVT, the transmission gear ratio can be adjusted regardless of the rotational speed of the engine. Therefore, ECVTs are widely used in vehicles such as scooters.

When the ISC of JP-A-2004-19740 is applied to a vehicle having an ECVT, the speed of the vehicle may problematically increase even if the rider does not open the throttle. In other words, the speed of the vehicle may increase regardless of the rider's intention to decrease speed. Drivability is thereby not desirable.

SUMMARY OF THE INVENTION

The present invention has been made in view of this situation and improves drivability of a vehicle provided with an ECVT and an idle speed control device.

A vehicle according to the present invention includes a drive wheel and an engine. An electronic continuously variable transmission adjusts a transmission gear ratio between an input shaft connected to the engine and an output shaft. A clutch is located between the engine and the drive wheel and is engaged and disengaged according to a rotational speed of the input or output shaft. An idle speed control device performs idle speed control to adjust an idle rotational speed of the engine. A control unit suppresses or stops the idle speed control when the clutch is engaged and/or when an abnormality is detected in the continuously variable transmission.

In one embodiment, the clutch is located between the output shaft and the drive wheel and is engaged and disengaged according to a rotational speed of the output shaft.

A controller according to the present invention, for a vehicle as described above, suppresses or stops the idle speed control when the clutch is engaged and/or when an abnormality in the continuously variable transmission is detected.

A control method according to the present invention, for a vehicle as described above, comprises suppressing or stopping an idle speed control when the clutch is engaged and/or when an abnormality in the continuously variable transmission is detected.

The present invention improves the drivability of a vehicle having an ECVT and an idle speed control device.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiment 1

Summary of the Embodiment

As a result of strenuous research, the inventors of the present invention have determined for the first time why a speed of a vehicle increases while a throttle is closed, and have made the invention described below. Before an embodiment of the invention is described in detail, the reason that vehicle speed increases while the throttle is closed is first described.

—Increase of Vehicle Speed while the Throttle Is Closed—

In a CVT using a centrifugal weight, a transmission gear ratio is decided according to rotational speed of an engine. When the rotational speed of the engine is relatively high, the transmission gear ratio is relatively low. Conversely, when the rotational speed of the engine is relatively low, the transmission gear ratio is relatively high. In a vehicle having an ECVT, however, the transmission gear ratio can be changed regardless of engine rotational speed. Accordingly, the transmission gear ratio can be low even when the rotational speed of the engine is low.

When the transmission gear ratio is low, the rotational speed of the output shaft of the ECVT is relatively high regardless of the fact that the rotational speed of the engine is low. As a result, a state can be generated in which a centrifugal clutch attached to the output shaft is not disengaged. In other words, the centrifugal clutch may be kept engaged even though the rotational speed of the engine is low.

Further, when the transmission gear ratio is low, the load on the engine is relatively high. Therefore, the rotational speed of the engine becomes lower than a target rotational speed. Accordingly, the ISC is activated to increase the rotational speed of the engine.

As described above, when the transmission gear ratio is kept low, the ISC may be actuated with the centrifugal clutch kept engaged, even if the rotational speed of the engine is low. Accordingly, even when the rider closes the throttle in order to decrease the speed of the vehicle provided with the ECVT, the ISC may be activated to problematically increase vehicle speed, because the transmission gear ratio is relatively small. In view of this determination by the inventors, the invention described below was made.

Figure 1:
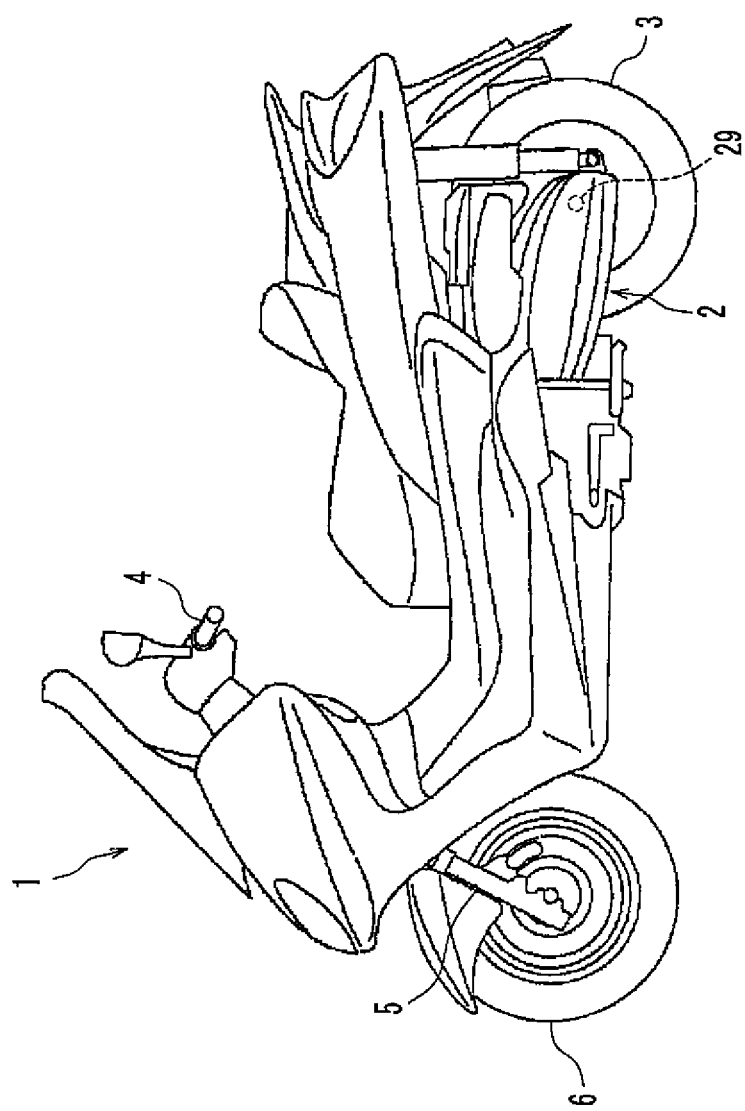
FIG. 1 is a side view of a two-wheeled motorized vehicle embodying the present invention.

An embodiment of the invention is described using a two-wheeled motorized vehicle 1 shown in FIG. 1 as an example. Vehicle 1 is a scooter-type vehicle, however, the invention is not limited to a scooter-type vehicle and may be, for example, an off-road type, a motorcycle type, a scooter type, or a moped type. The vehicle may also be a straddle-type vehicle other than a two-wheeled motorized vehicle such as, for example, an all terrain vehicle (ATV) or the like. Further, the vehicle may be a vehicle other than a straddle type vehicle, such as a four-wheeled motorized vehicle.

Vehicle 1 is described as provided with a belt type ECVT. However, the invention is not so limited and an ECVT other than a belt type ECVT may be used, such as a toroidal type ECVT.

<<Detailed Description of the Two-Wheeled Motorized Vehicle 1>>

(General Construction of Two-Wheeled Motorized Vehicle 1)

FIG. 1 is a side view of vehicle 1. An engine unit 2 is suspended from a body frame. A rear wheel 3 provided at a rear end of engine unit 2 is a drive wheel for driving a wheel with power outputted from engine unit 2.

Front forks 5 are connected to a bottom end of a head pipe extending downward from steering handlebars 4. A front wheel 6 rotatably attached to lower ends of front forks 5 is a driven wheel not connected to engine unit 2.

(Construction of Engine Unit 2)

The constitution of engine unit 2 is now described with reference to FIGS. 2-4.

—Construction of Engine 10—

Figure 2:
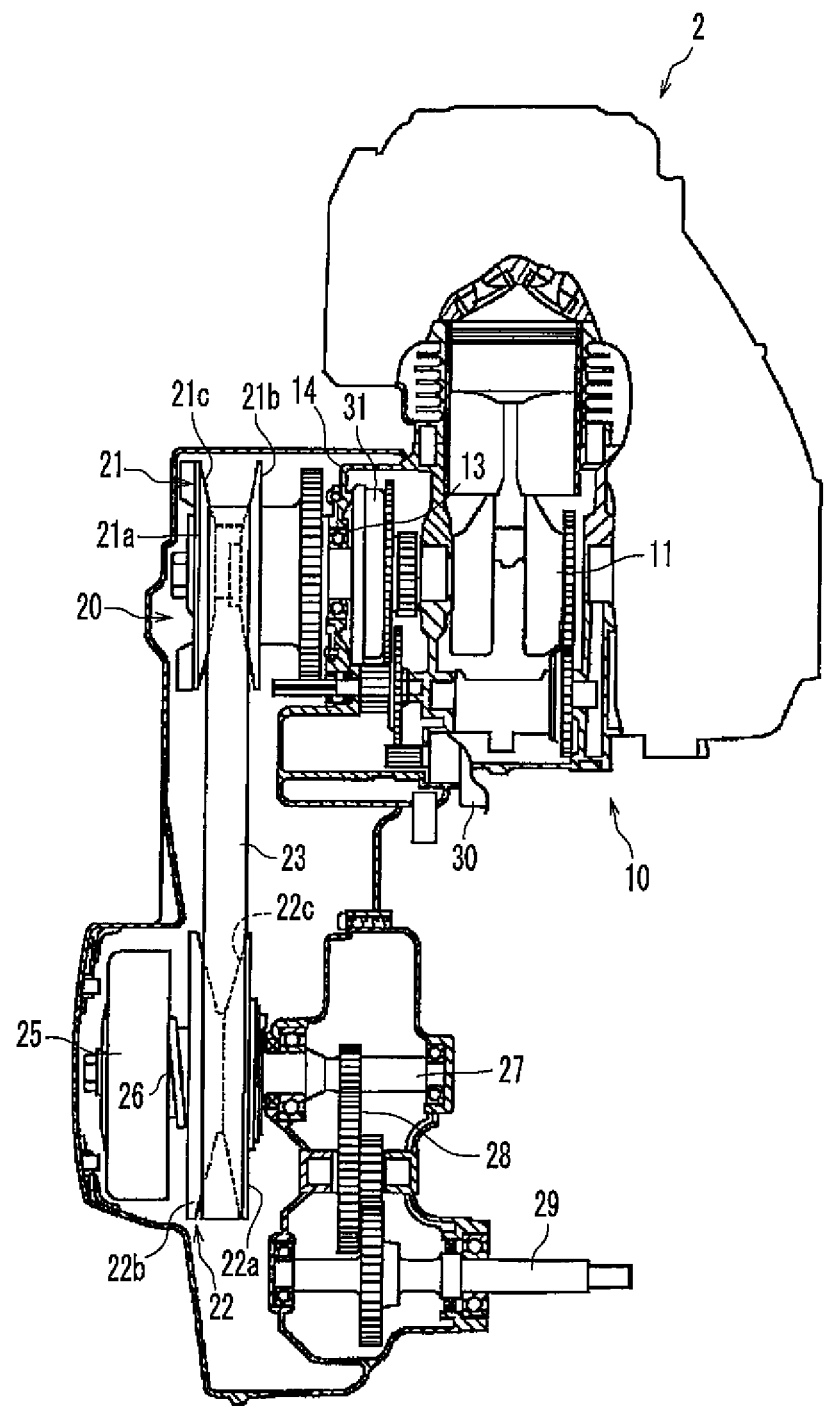
FIG. 2 is a sectional view of an engine unit of the vehicle.
Figure 3:
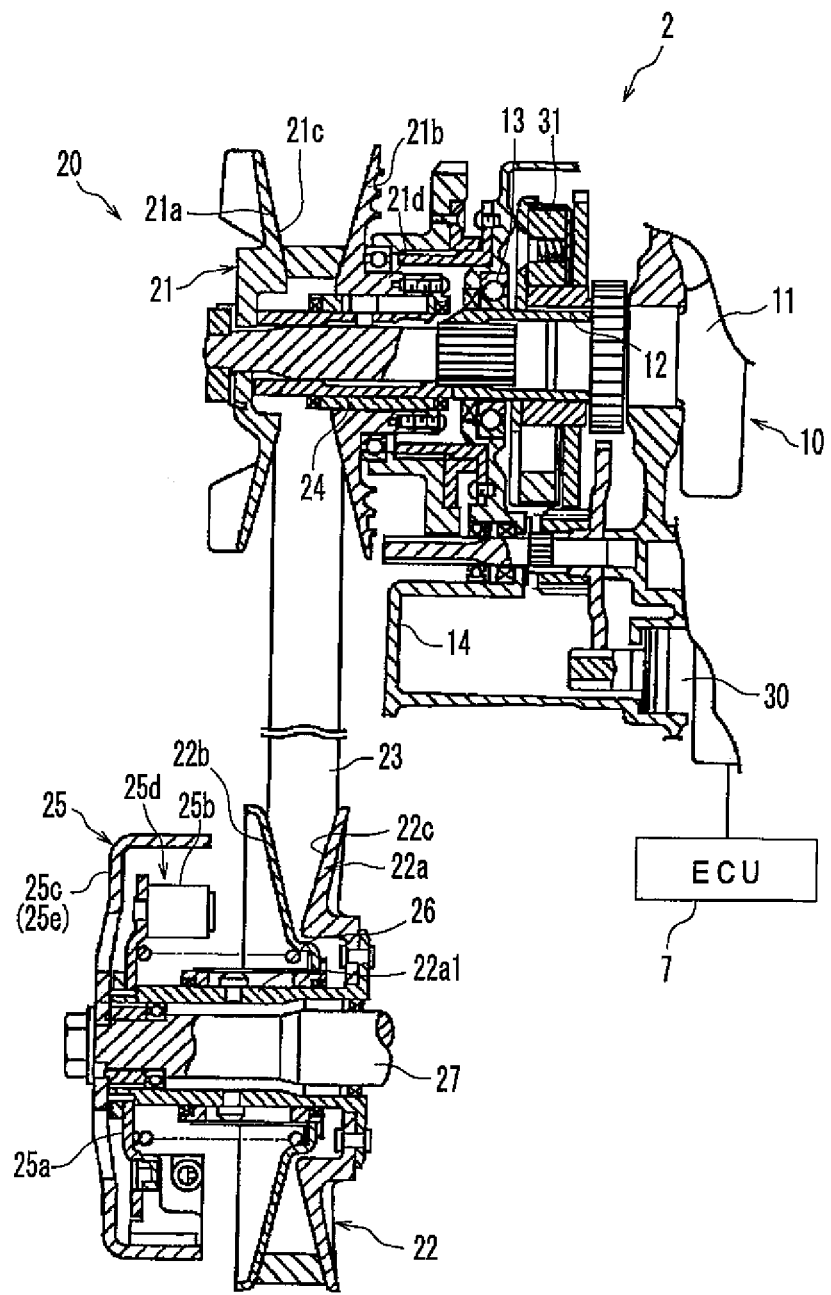
FIG. 3 is a partial cross-sectional view of a CVT of the vehicle.

As shown in FIGS. 2 and 3, engine unit 2 has an internal combustion engine 10 and a transmission 20. While engine 10 is described as a forced-air-cooled four-stroke engine, engine 10 may be another type of engine such as a water-cooled engine or a two-stroke engine.

Engine 10 has a crankshaft 11. A sleeve 12 is spline-fitted onto an outer circumference of crankshaft 11 and is rotatably supported by a housing 14 via a bearing 13. A one-way clutch 31 connected to an electric motor 30 is attached to the outer circumference of sleeve 12.

—Constitution of An ISC Device 9—

Figure 4:
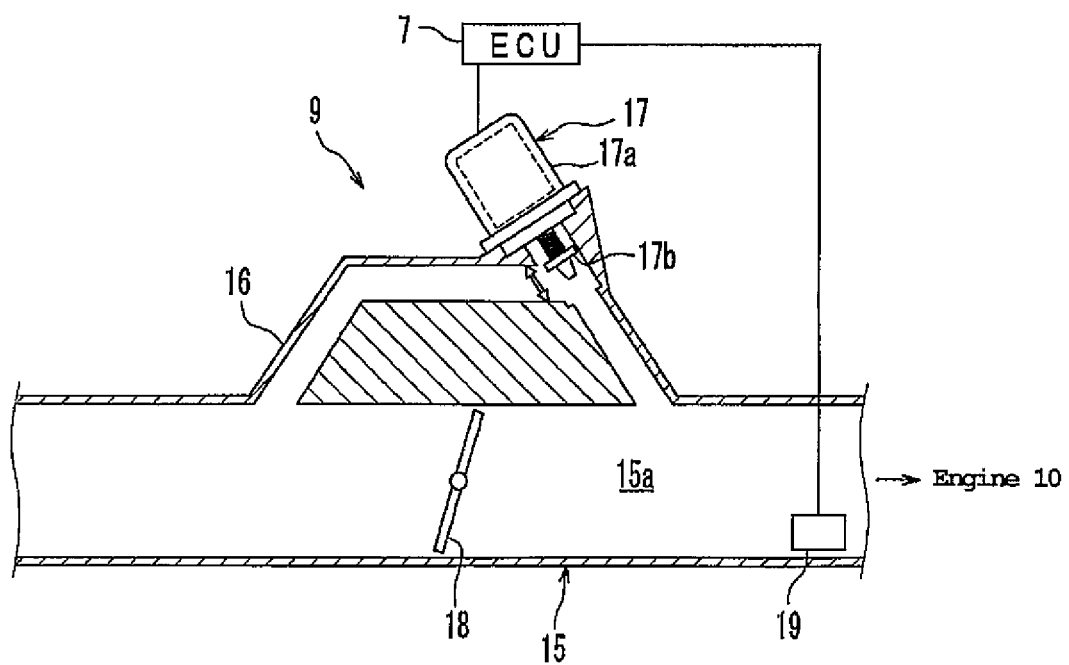
FIG. 4 is a cross-sectional view illustrating components in the vicinity of an air intake pipe of an engine of the vehicle.

FIG. 4 is a cross-sectional view illustrating components in a vicinity of an air intake pipe 15 that supplies engine 10 with air. A throttle valve 18 (air intake pipe valve) located in air intake pipe 15 adjusts the amount of air flowing in air intake pipe 15 by adjusting the air passage area in air intake pipe 15. Throttle valve 18 is operated by a throttle. As the throttle is opened, throttle valve 18 is opened to increase the amount of air flowing in air intake pipe 15.

A throttle opening degree sensor 18a (FIG. 5) attached to throttle valve 18 detects the opening degree of throttle valve 18.

Figure 5:
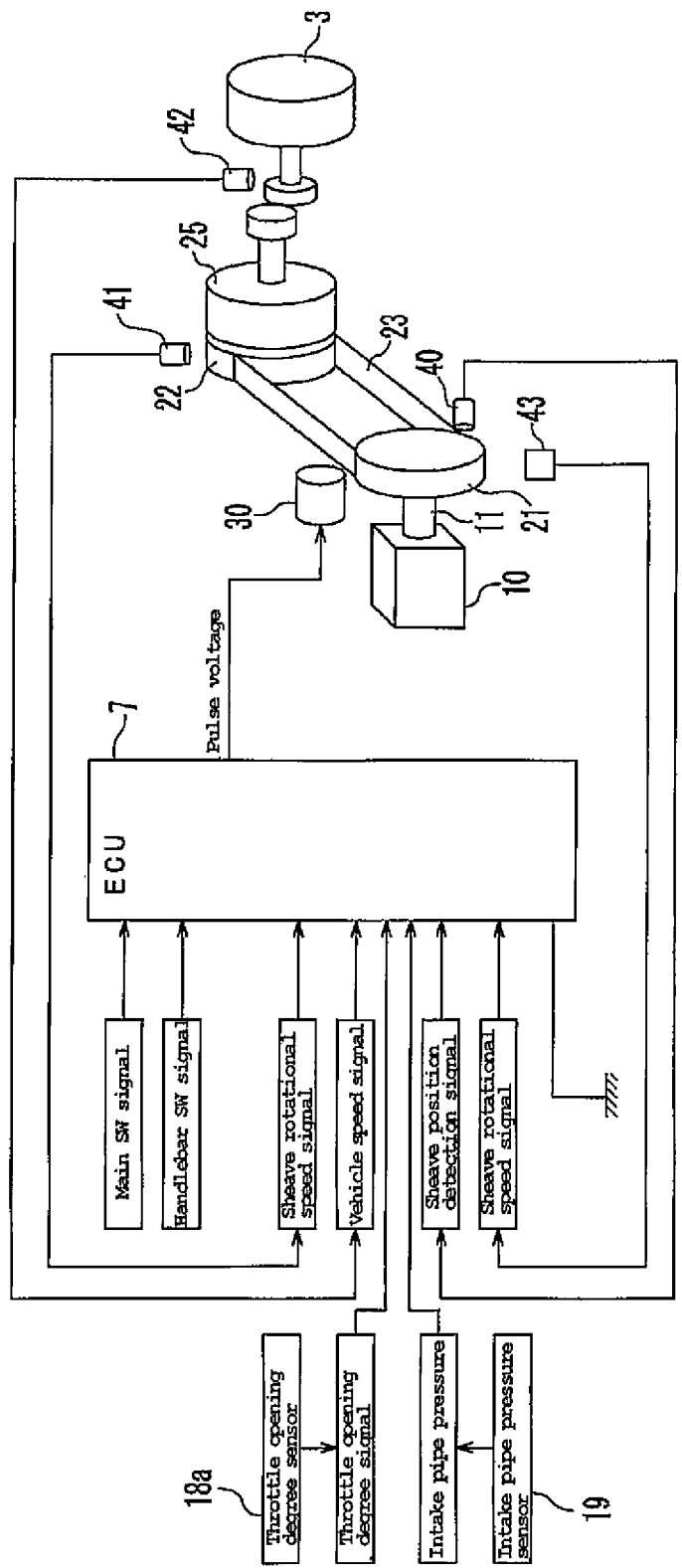
FIG. 5 is a block diagram of a system for controlling the vehicle.

An air intake pipe pressure sensor 19 is located in a downstream section 15a of air intake pipe 15 on the engine 10 side with respect to throttle valve 18. The pressure of downstream section 15a is detected by sensor 19. As shown in FIG. 5, sensor 19 outputs the pressure of downstream section 15a as intake pipe pressure to an ECU 7.

An ISC device 9 that adjusts the rotational speed of the engine when vehicle 1 is idling by adjusting the amount of air flowing in air intake pipe 15 is attached to air intake pipe 15. ISC device 9 comprises a by-pass pipe 16, an air quantity adjusting device 17 and ECU 7. By-pass pipe 16 bypasses a section of air intake pipe 15 in which throttle valve 18 is located and connects upstream and downstream sides of air intake pipe 15 with respect to throttle valve 18. Air quantity adjusting device 17 adjusts the amount of air flowing in air intake pipe 15 by adjusting an air passage area in by-pass pipe 16. Air quantity adjusting device 17 is provided with an actuator 17a and a by-pass pipe valve 17b located in by-pass pipe 16 and actuated by actuator 17a. By-pass pipe valve 17b adjusts the amount of air flowing in by-pass pipe 16 by adjusting an air passage area in by-pass pipe 16. Actuator 17a may comprise, for example, by a stepping motor or the like.

—Construction of Transmission 20—

In this embodiment, transmission 20 is a belt type ECVT. Transmission 20, however, is not limited to a belt type ECVT and may be, for example, a toroidal type ECVT. As shown in FIGS. 2 and 3, transmission 20 is provided with a V-belt 23 wrapped around a primary sheave 21 and a secondary sheave 22. V-belt 23 may be a rubber belt type, resin block belt type, and the like.

Primary sheave 21 rotates together with crankshaft 11 and includes a fixed sheave half 21a and a movable sheave half 21b. Fixed sheave half 21a is fixed to one end of crankshaft 11. Movable sheave half 21b is opposed to fixed sheave half 21a and is movable in the axial direction of crankshaft 11. Opposing surfaces of fixed sheave half 21a and movable sheave half 21b form a belt groove 21c into which V-belt 23 is wrapped. As shown in FIG. 3, movable sheave half 21b has a cylindrical boss section 21d through which crankshaft 11 passes. A cylindrical slider 24 is fixed in boss section 21d. Movable sheave half 21b is integral with slider 24 and movable in the axial direction of crankshaft 11. Accordingly, a width of belt groove 21c is variable.

The width of belt groove 21c is changed as movable sheave half 21b is driven in the axial direction of crankshaft 11 by electric motor 30. Electric motor 30 may also be used as a starter motor.

Secondary sheave 22 is located at the rear of primary sheave 21 and is mounted to a driven shaft 27 via a centrifugal clutch 25. Secondary sheave 22 includes a movable sheave half 22b opposed to a fixed sheave half 22a connected to driven shaft 27 via centrifugal clutch 25. Movable sheave half 22b is movable in the axial direction of driven shaft 27. Opposing surfaces of fixed sheave half 22a and movable sheave half 22b form a belt groove 22c into which V-belt 23 is wrapped.

Movable sheave half 22b is urged by a spring 26 in a direction to decrease a width of belt groove 22c. Consequently, the width of belt groove 21c decreases, and the winding diameter of V-belt 23 around primary sheave 21 increases. As a result, V-belt 23 is pulled inward in the radial direction on the side of secondary sheave 22. Thus, movable sheave half 22b moves against the urging force of spring 26 in a direction to increase the width of belt groove 22c. Therefore, the diameter with which V-belt 23 is wrapped around secondary sheave 22 decreases.

—Construction of Centrifugal Clutch 25—

Centrifugal clutch 25 is provided with a centrifugal plate 25a, a centrifugal weight 25b and a clutch housing 25c. Centrifugal plate 25a rotates together with fixed sheave half 22a.

Centrifugal weight 25b is supported by centrifugal plate 25a such that it is displaceable in the radial direction of centrifugal plate 25a.

A first clutch member 25d is constituted by centrifugal plate 25a and centrifugal weight 25b. An output shaft 22a1 of transmission 20 is formed integrally on fixed sheave half 22a of secondary sheave 22 and is constituted by a cylindrical section of fixed sheave half 22a in which driven shaft 27 is inserted.

A second clutch member 25e is constituted by clutch housing 25c. Clutch housing 25c is fixed to one end of driven shaft 27. Driven shaft 27 is connected to an axle 29 via a deceleration mechanism 28. Rear wheel 3 is mounted to axle 29. Therefore, clutch housing 25c is connected to the drive wheel or rear wheel 3 via driven shaft 27, deceleration mechanism 28 and axle 29. Clutch housing 25c is engaged with and disengaged from first clutch member 25d according to the rotational speed of output shaft 22a1. When the rotational speed of output shaft 22a1 reaches or exceeds a predetermined rotational speed, centrifugal weight 25b is moved outward in the radial direction of centrifugal plate 25a by centrifugal force and comes in contact with clutch housing 25c. As a result, first clutch member 25d is engaged with clutch housing 25c as second clutch member 25e, and rotation of output shaft 22a1 is transmitted to rear wheel 3 via clutch housing 25c, driven shaft 27, deceleration mechanism 28 and axle 29. When the rotational speed of output shaft 22a1 is less than the predetermined rotational speed, the centrifugal force applied to centrifugal weight 25b is decreased and centrifugal weight 25b is detached from clutch housing 25c. Therefore, rotation of output shaft 22a1 is not transmitted to clutch housing 25c and rear wheel 3 does not rotate.

(System for Controlling Two-Wheeled Motorized Vehicle 1)

A system for controlling vehicle 1 is described with reference to FIG. 5. Transmission 20, engine 10 and so forth are controlled by ECU 7 as a controller.

—Summary of the Control System of Vehicle 1—

As shown in FIG. 5, a sheave position sensor 40 connected to ECU 7 comprises the transmission gear ratio sensor for detecting the transmission gear ratio of transmission 20. Sheave position sensor 40 detects the transmission gear ratio of transmission 20 by detecting a state of a movable section of transmission 20. In particular, sheave position sensor 40 detects and outputs the position of movable sheave half 21b of primary sheave 21 as a sheave position detection signal to ECU 7. Sheave position sensor 40 may be formed by a potentiometer, for example.

In addition, a primary sheave rotation sensor 43, a secondary sheave rotation sensor 41 and a vehicle speed sensor 42 are connected to ECU 7. Primary sheave rotation sensor 43 detects the rotational speed of primary sheave 21 and outputs a primary sheave rotational speed signal to ECU 7. Secondary sheave rotation sensor 41 detects a rotational speed of secondary sheave 22 and outputs a secondary sheave rotational speed signal to ECU 7. Vehicle speed sensor 42 detects the rotational speed of rear wheel 3 and outputs to ECU 7 a vehicle speed signal.

A handlebar switch attached to steering handlebars 4 is connected to ECU 7 and outputs a handlebar SW signal when operated. As described above, a throttle opening sensor 18a outputs a throttle opening signal to ECU 7.

—Control of the Transmission 20—

ECU 7 controls the sheave position of movable sheave half 21b of primary sheave 21 on the basis of the vehicle speed signal output from vehicle speed sensor 42. A target transmission gear ratio is decided by ECU 7 depending on the throttle opening degree and the vehicle speed. ECU 7 calculates a target sheave position based on the determined target change-gear ratio. The sheave position of movable sheave half 21b of primary sheave 21 is controlled according to the calculated sheave target position.

The driving system of electric motor 30 is not specifically limited. In this embodiment, electric motor 30 is driven by a pulse width modulation (PWM) drive. ECU 7 is provided with a drive circuit for electric motor 30 and a CPU (central processing unit) for outputting a signal to the drive circuit. The CPU outputs a PWM signal to the drive circuit, which applies a pulse voltage in accordance with the PWM signal to drive electric motor 30. However, electric motor 30 may alternatively be a step motor type.

—Idle Speed Control Feedback Control—

Idle speed control feed back (ISC F/B) control changes the rotational speed of engine 10 in the idling state. ISC F/B control, for example, may increase the idle rotational speed in order to promptly warm up vehicle 1 when idling.

Figure 6:
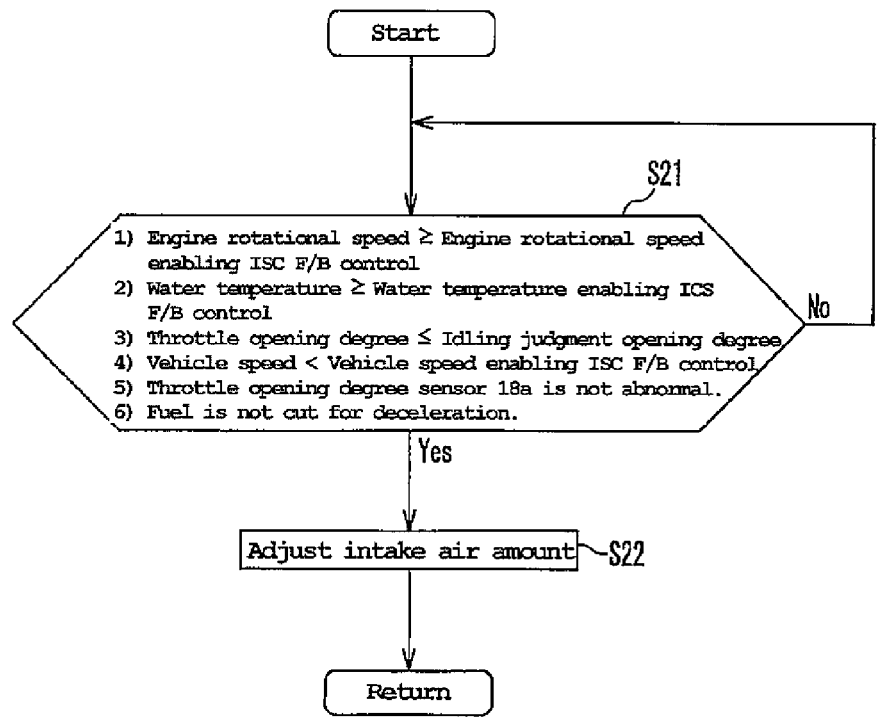
FIG. 6 is a flow chart illustrating ISC F/B control in the vehicle.

ISC F/B control is performed according to the flow chart of FIG. 6. Whether conditions 1) to 6) are satisfied is first judged in step S21. If conditions 1) to 6) are satisfied in step S21, the amount of intake air to engine 10 is adjusted (increased or decreased) in step S22. If the amount of intake air to engine 10 is to be increased, for example, by-pass pipe valve 17b is actuated by actuator 17a, the air passage area in by-pass pipe 16 is expanded, and the amount of intake air to engine 10 is increased.

On the other hand, if conditions 1) to 6) are not satisfied, the procedure returns to step S21. Conditions 1) to 6) are as follows.

1) Engine rotational speed≥Engine rotational speed enabling ISC F/B control.

2) Cooling water temperature of engine 10≥Water temperature enabling ICS F/B control.

3) Throttle opening degree≤Idling judgment opening degree.

4) Vehicle speed of two-wheeled motorized vehicle 1<Vehicle speed enabling ISC F/B control.

5) Throttle opening degree sensor 18a is not abnormal.

6) Fuel is not cut for deceleration.

Conditions 1) and 2) avoid stopping of engine 10. The engine rotational speed enabling ISC F/B control in condition 1) can be set, for example, to 500 rpm. The engine rotational speed enabling ISC F/B control in condition 1) and the water temperature enabling ISC F/B control in condition 2) can be appropriately set according to the type of vehicle, the use environment thereof and so forth.

Conditions 3) and 4) judge whether vehicle 1 is in a state of idling with vehicle speed not very high. The idling judgment opening degree in condition 3) and the vehicle speed enabling ISC F/B control in condition 4) can also be appropriately set according to the type of vehicle, the use environment thereof and so forth.

Condition 6) judges whether fuel has already been cut for deceleration as a result of any control other than ISC F/B control.

—Suppressing Or Stopping ISC F/B Control—

Figure 7:
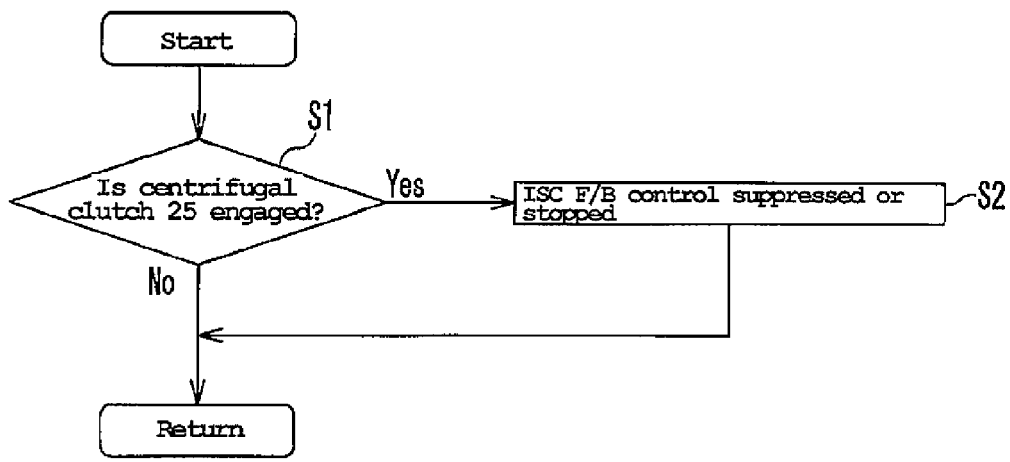
FIG. 7 is a flow chart illustrating control to suppress or stop ISC F/B control on the basis of the state of engagement of a centrifugal clutch of the vehicle.

ISC F/B control is suppressed or stopped when centrifugal clutch 25 is engaged according to the flow chart of FIG. 7. As shown in FIG. 7, step S1 judges whether centrifugal clutch 25 is engaged. Specifically, step S1 judges whether first clutch member 25d and second clutch member 25e are engaged.

Judging whether centrifugal clutch 25 is engaged is not limited to a specific method. For instance, whether centrifugal clutch 25 is engaged may depend on the rotational speed of first clutch member 25d detected by secondary sheave rotation sensor 41. Specifically, centrifugal clutch 25 may be judged to be engaged when the rotational speed of first clutch member 25d and driven shaft 27 is equal to or higher than a predefined rotational speed.

Further, whether centrifugal clutch 25 is engaged may depend on the difference between the rotational speed of first clutch member 25d and driven shaft 27 and the rotational speed of second clutch member 25e. Specifically, centrifugal clutch 25 may be judged to be engaged when the rotational speed of first clutch member 25d and driven shaft 27 is practically equal to the rotational speed of second clutch member 25e.

If it is judged in step S1 that centrifugal clutch 25 is engaged, ISC F/B control is suppressed or stopped. In order to suppress ISC F/B control, the gain of ISC F/B control may be decreased, or the feedback frequency of ISC F/B control may be reduced.

<<Operation And Effect>>

The speed of vehicle 1 may increase regardless of the fact that the throttle is closed. This happens when centrifugal clutch 25 is engaged. When centrifugal clutch 25 is not engaged, the power of engine 10 is not transmitted to rear wheel 3. Accordingly, the speed of vehicle 1 is not increased while the throttle is closed. In the embodiment, ISC F/B control is suppressed or stopped when centrifugal clutch 25 is engaged. As a result, the speed of vehicle 1 is not increased against the rider's intention and excellent drivability is achieved.

ISC F/B control adjusts the engine rotational speed when vehicle 1 is idling. Therefore, ISC F/B control is not necessary when the rotational speed of the engine is relatively high so that centrifugal clutch 25 is engaged. Accordingly, suppressing ISC F/B control while centrifugal clutch 25 is engaged is not problematic.

ISC F/B control may or may not be performed while centrifugal clutch 25 is in a half-clutch state.

<<Modification 1>>

An example in which ISC F/B control is suppressed or stopped when centrifugal clutch 25 is engaged has been described. The invention, however, is not limited to the embodiment above. For instance, ISC F/B control may be suppressed or stopped when an abnormality occurs in transmission 20. Suppressing and stopping ISC F/B control in a modified example 1 is described with reference to FIG. 8. Operations other than suppressing and stopping ISC F/B control are the same as those in the embodiment above, and FIGS. 1-6 are also referred to.

Figure 8:
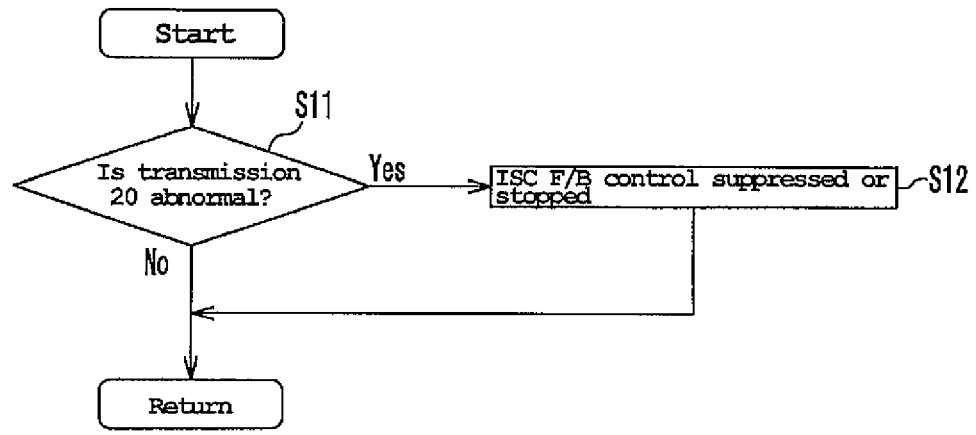
FIG. 8 is a flow chart illustrating control to suppress or stop ISC F/B control on the basis of an abnormality in a transmission 20 in modified example 1 of the invention.

As shown in FIG. 8, step S11 judges whether an abnormality in transmission 20 has occurred. When an abnormality has occurred, ISC F/B control is suppressed or stopped in step S12, in the same manner as in step S2.

An abnormality in transmission 20 indicates that control of the transmission gear ratio is not performed as usual in transmission 20. This may include an abnormality in at least one of primary sheave rotation sensor 43 as the input shaft rotational speed sensor, throttle opening degree sensor 18a, vehicle speed sensor 42, a transmission mechanism of transmission 20 excluding or including ECU 7, wiring connecting ECU 7 and the transmission mechanism and so forth, sheave position senor 40 as the transmission gear ratio sensor or secondary sheave rotation sensor 41.

<<Operation And Effect>>

When an abnormality has occurred in transmission 20, the transmission gear ratio of transmission 20 may be kept relatively high regardless of the fact that the throttle is closed. Therefore, an increase of vehicle speed against the rider's intention can be avoided by suppressing or stopping ISC F/B control when an abnormality has occurred in transmission 20.

<<Modification 2>>

Figure 9:
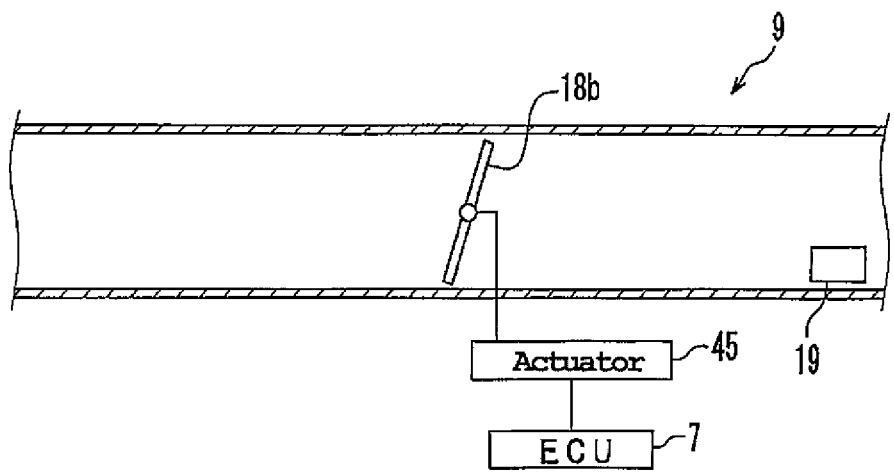
FIG. 9 is a cross-sectional view of components in a vicinity of an air intake pipe of an engine in modified example 2 of the invention.

While ISC device 9 has been described as having by-pass pipe 16, the invention is not limited to an ISC device having a by-pass pipe. As shown in FIG. 9, ISC device 9 may comprise a throttle valve 18b actuated by an actuator 45. In FIG. 9, the opening degree of throttle valve 18b is electronically controlled by ECU 7.

<<Modification 3>>

Figure 10:
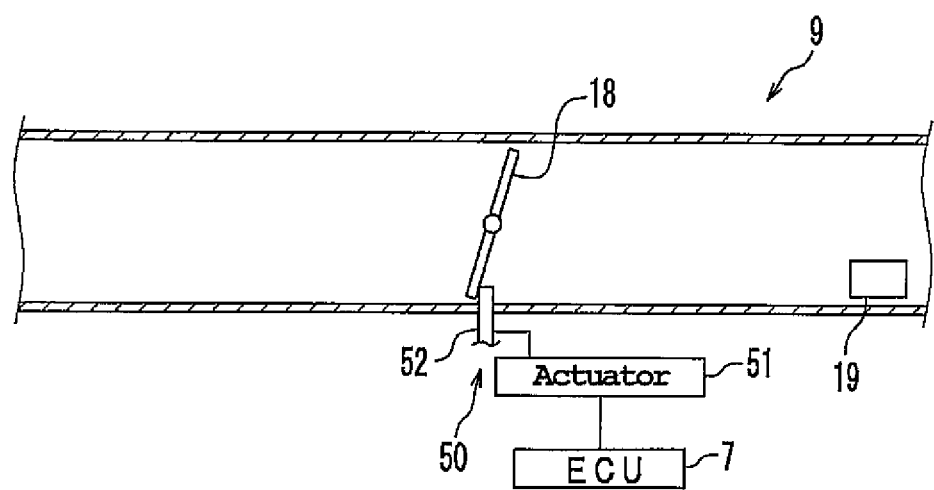
FIG. 10 is a cross-sectional view illustrating components in a vicinity of an air intake pipe of an engine in modified example 3 of the invention.

Further, as shown in FIG. 10, ISC device 9 may comprise a throttle opening degree adjusting device 50 for forcibly adjusting the opening degree of throttle valve 18 of a non-electronic control type and ECU 7. Throttle opening degree adjusting device 50 may be constituted by, for example, a pressing member 52 for pressing throttle valve 18 and an actuator 51 for actuating pressing member 52. Specifically, throttle opening degree adjusting device 50 may be constituted by a solenoid element.

<<Modification 4>>

Centrifugal clutch 25 is located between output shaft 22a1 and rear wheel 3 in the above embodiment. However, centrifugal clutch 25 only has to be located in the power transmission path between engine 10 and rear wheel 3. For example, centrifugal clutch 25 may be located between crankshaft 11 as an input shaft and primary sheave 21. Centrifugal clutch 25 does not have to be engaged or disengaged according to the rotational speed of output shaft 22a1, but may be engaged or disengaged according to the rotational speed of crankshaft 11 as an input shaft.

Embodiment 2

Figure 11:
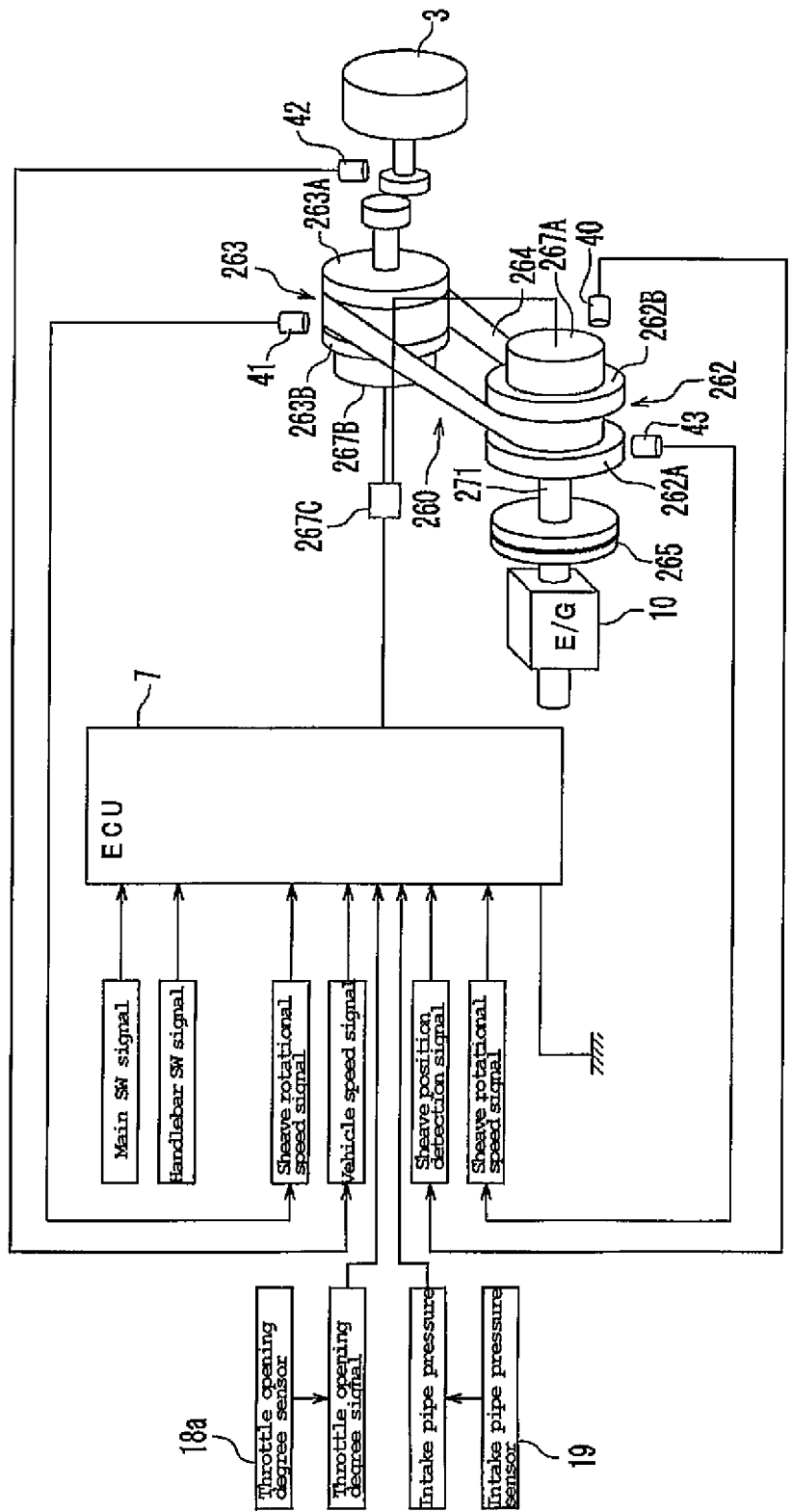
FIG. 11 is a block diagram of a control system in accordance with a second embodiment of the invention.

FIG. 11 is a block diagram illustrating a system for controlling a vehicle in accordance with a second embodiment of the invention. In embodiment 2, variable transmission 260 is a belt type ECVT having a so-called metal belt 264.

The actuator of ECVT in embodiment 1 is electric motor 30. However, the actuator is not limited to an electric motor. The actuator of ECVT in embodiment 2, for example, is a hydraulic actuator.

Centrifugal clutch 25 of embodiment 1 is mechanically engaged or disengaged according to the rotational speed of output shaft 22a1 of transmission mechanism 20. However, in the present invention, any type of clutch is acceptable as long as it is engaged or disengaged according to the rotational speed of the input or output shaft of the transmission mechanism. The clutch does not have to be engaged or disengaged mechanically and may be controlled to be engaged or disengaged according to rotational speed. In embodiment 2, electrically controlled multiple friction clutch 265 is used as the clutch.

As shown in FIG. 11, the vehicle of embodiment 2 includes electrically controlled multiple friction clutch 265 and ECVT type variable transmission 260. Variable transmission 260 includes metal belt 264 wound around primary sheave 262 and secondary sheave 263. Primary sheave 262 includes fixed sheave half 262A and movable sheave half 262B. Secondary sheave 263 includes fixed sheave half 263A and movable sheave half 263B.

A primary sheave rotation sensor 43 is equipped to primary sheave 262. A secondary sheave rotation sensor 41 is equipped to secondary sheave 263.

The vehicle includes a hydraulic control valve 267C connected to hydraulic cylinders 267A and 267B. Hydraulic cylinder 267A adjusts the groove width of primary sheave 262 by driving movable sheave half 262B. Hydraulic cylinder 267B adjusts the groove width of secondary sheave 263 by driving movable sheave half 263B. Hydraulic control valve 267C adjusts the hydraulic pressure applied to hydraulic cylinders 267A and 267B. Hydraulic control valve 267C controls hydraulic cylinders 267A and 267B such that one of them has higher pressure when the other has lower pressure. Hydraulic control valve 267C is controlled by ECU 7.

Multiple friction clutch 265 is located between engine 10 and input shaft 271 of variable transmission 260, and is controlled such that it is connected when the speed of engine 10 exceeds a predetermined value and is disconnected when the speed of engine 10 is below the predetermined value.

The control in embodiment 1 is also performed in embodiment 2. That is, ISC FIB control is suppressed or stopped when multiple friction clutch 265 is engaged (FIG. 7). If an abnormality of transmission 260 occurs, ISC F/B control is suppressed or stopped (FIG. 8).

ISC F/B control may or may not be performed while multiple friction clutch 265 is in the half clutch state.

<<Other Variations>>

The present invention may be applied to a vehicle other than a scooter-type vehicle such as an off-road type, a motorcycle type, a scooter type, or a moped type. Also, the vehicle may be a straddle-type vehicle other than a two-wheeled motorized vehicle such as, for example, an all terrain vehicle (ATV) or the like. Further, the vehicle may be a vehicle other than a straddle type vehicle, such as a four-wheeled vehicle.

The transmission may be, for example, an ECVT of a toroidal type.

Engine 10 may be an engine of a type other than a four-cycle engine of a forced air cooling type. For example, engine 10 may be a water-cooled engine or a two-stroke engine.

The conditions for ISC F/B control may be different from those shown in FIG. 6 and appropriately decided depending on a vehicle type or the like.

<<Definition of Terms in the Specification>>

"Idle rotational speed" indicates the rotational speed of the engine at a time of idling of the vehicle.

"Suppressing ISC F/B control" indicates decreasing the gain of ISC F/B control or increasing the feedback frequency of ISC F/B control.

An "abnormality in transmission" indicates that control of the transmission gear ratio is not performed as usual in the transmission. This may include an abnormality in at least one of primary sheave rotation sensor 43 as the input shaft rotational speed sensor, throttle opening degree sensor 18a, vehicle speed sensor 42, a transmission mechanism of transmission 20 excluding or including ECU 7, wiring connecting ECU 7 and the transmission mechanism and so forth, sheave position senor 40 as the transmission gear ratio sensor or secondary sheave rotation sensor 41.

The "state in which the clutch is engaged" may or may not include the state in which the clutch is half engaged depending on the vehicle to which the present invention is applied.

"Clutch engaged or disengaged according to the rotational speed" includes a clutch that is controlled to be engaged or disengaged along with a centrifugal clutch that is mechanically engaged or disengaged according to the rotational speed.

The present invention is useful for a vehicle such as a straddle-type vehicle and the like.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A two-wheeled, motorized vehicle comprising:
a drive wheel;
an engine;
an electronic continuously variable transmission that adjusts a transmission gear ratio between an input shaft connected to the engine and an output shaft;
a clutch, located between the engine and the drive wheel, that is engaged or disengaged according to a rotational speed of the input shaft or a rotational speed of the output shaft;
an idle speed control device that performs idle speed control to adjust an idle rotational speed of the engine; and
an electronic control unit that is configured to stop the idle speed control device from performing any idle speed control when the clutch is engaged and while the engine is actuated so that the engine is actuated while the idle speed control device is stopped from performing any idle speed control.

2. The vehicle according to claim 1, wherein the clutch is located between the output shaft and the drive wheel and is engaged or disengaged according to the rotational speed of the output shaft.

3. The vehicle according to claim 2, wherein
the clutch includes a first clutch member connected to the output shaft and a second clutch member connected to the drive wheel that engages or disengages with the first clutch member according to the rotational speed of the output shaft, and
the control unit determines an engaged or disengaged state of the clutch based on a rotational speed of the first clutch member or the difference in rotational speeds of the first and second clutch members.

4. The vehicle of claim 1, wherein the control unit stops the idle speed control device such that a vehicle speed does not increase.

5. The vehicle of claim 1, wherein the control unit stops the idle speed control device in every instance that the clutch is engaged and while the engine is actuated.

6. A two-wheeled, motorized vehicle comprising:
a drive wheel;
an engine;
an electronic continuously variable transmission that adjusts a transmission gear ratio between an input shaft connected to the engine and an output shaft;
a clutch, located between the engine and the drive wheel, that is engaged or disengaged according to a rotational speed of the input shaft or a rotational speed of the output shaft;
an idle speed control device that performs idle speed control to adjust an idle rotational speed of the engine; and
an electronic control unit that is configured to stop the idle speed control device from performing any idle speed control when an abnormality is detected in the electronic continuously variable transmission and while the engine is actuated so that the engine is actuated while the idle speed control device is stopped from performing any idle speed control.

7. The vehicle according to claim 6, wherein the clutch is located between the output shaft and the drive wheel and is engaged or disengaged according to the rotational speed of the output shaft.

8. The vehicle according to claim 7, further comprising:
an input shaft rotational speed sensor for detecting the rotational speed of the input shaft;
a throttle opening degree sensor; and
a vehicle speed sensor, wherein the continuously variable transmission further has a transmission control system for controlling the transmission gear ratio, and a transmission gear ratio sensor for detecting the transmission gear ratio, and the abnormality in the continuously variable transmission is an abnormality in at least one of the transmission control system, the input shaft rotational speed sensor, the throttle opening degree sensor, the vehicle speed sensor and the transmission gear ratio sensor.

9. The vehicle according to claim 7, wherein the continuously variable transmission further has a transmission control system for controlling the transmission gear ratio, and the abnormality in the continuously variable transmission is an abnormality in the transmission control system.

10. The vehicle of claim 6, wherein the control unit stops the idle speed control device such that a vehicle speed does not increase.

11. An electronic controller for a two-wheeled, motorized vehicle having a clutch, between an engine and a drive wheel, that is engaged or disengaged according to a rotational speed of an input shaft or a rotational speed of an output shaft of a continuously variable transmission, and an idle speed control device for performing idle speed control to adjust an idle rotational speed of the engine, wherein the electronic controller is configured to stop the idle speed control device from performing any idle speed control when the clutch is engaged and while the engine is actuated so that the engine is actuated while the idle speed control device is stopped from performing any idle speed control.

12. A controller according to claim 11, wherein the clutch is located between the output shaft and the drive wheel and is engaged or disengaged according to the rotational speed of the output shaft.

13. A controller according to claim 11, wherein the controller stops the idle speed control device in every instance that the clutch is engaged and while the engine is actuated.

14. An electronic controller for a two-wheeled, motorized vehicle having a clutch, between an engine and a drive wheel, that is engaged or disengaged according to a rotational speed of an input shaft or a rotational speed of an output shaft of a continuously variable transmission, and an idle speed control device for performing idle speed control to adjust an idle rotational speed of the engine, wherein the electronic controller is configured to stop the idle speed control device from performing any idle speed control when an abnormality is detected in the continuously variable transmission and while the engine is actuated so that the engine is actuated while the idle speed control device is stopped from performing any idle speed control.

15. A controller according to claim 14, wherein the clutch is located between the output shaft and the drive wheel and is engaged or disengaged according to the rotational speed of the output shaft.

16. A control method for a two-wheeled, motorized vehicle having a clutch, located between an engine and a drive wheel, that is engaged or disengaged according to a rotational speed of an input shaft or a rotational speed of an output shaft of a continuously variable transmission, and an idle speed control device for performing idle speed control to adjust an idle rotational speed of the engine, wherein the control method comprises:

stopping, by an electronic control unit, the idle speed control device from performing any idle speed control when the clutch is engaged and while the engine is actuated so that the engine is actuated while the idle speed control device is stopped from performing any idle speed control.

17. A control method according to claim 16, wherein the clutch is located between the output shaft and the drive wheel and is engaged or disengaged according to the rotational speed of the output shaft.

18. A control method according to claim 16, wherein stopping the idle speed control device includes stopping the idle speed control in every instance that the clutch is engaged and while the engine is actuated.

19. A control method for a two-wheeled, motorized vehicle having a clutch, located between an engine and a drive wheel, that is engaged or disengaged according to a rotational speed of an input shaft or a rotational speed of an output shaft of a continuously variable transmission, and an idle speed control device for performing idle speed control to adjust an idle rotational speed of the engine, wherein the control method comprises:

detecting an abnormality in the continuously variable transmission; and stopping, by an electronic control unit, the idle speed control device from performing any idle speed control when the abnormality is detected and while the engine is actuated so that the engine is actuated while the idle speed control device is stopped from performing any idle speed control.

20. A control method according to claim 19, wherein the clutch is located between the output shaft and the drive wheel and is engaged or disengaged according to the rotational speed of the output shaft.

* * * * *